(12) United States Patent
Umeda et al.

(10) Patent No.: US 10,027,378 B2
(45) Date of Patent: Jul. 17, 2018

(54) POWER RECEPTION DEVICE, POWER TRANSMISSION DEVICE, AND WIRELESS POWER TRANSMISSION SYSTEM

(71) Applicant: KABUSHIKI KAISHA TOSHIBA, Minato-ku, Tokyo (JP)

(72) Inventors: Toshiyuki Umeda, Tokyo (JP); Hideo Kasami, Yokohama Kanagawa (JP); Takeshi Ueno, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/266,933

(22) Filed: Sep. 15, 2016

(65) Prior Publication Data
US 2017/0141818 A1 May 18, 2017

(30) Foreign Application Priority Data
Nov. 13, 2015 (JP) .................... 2015-223267

(51) Int. Cl.
*H04B 5/00* (2006.01)
*H02J 7/02* (2016.01)
*H02J 7/00* (2006.01)

(52) U.S. Cl.
CPC ............ *H04B 5/0037* (2013.01); *H02J 7/025* (2013.01); *H02J 7/0013* (2013.01); *H02J 7/0027* (2013.01); *H02J 2007/0098* (2013.01)

(58) Field of Classification Search
CPC .......... H02J 7/0013; H02J 7/0027; H02J 7/02; H02J 7/022; H02J 7/025; H02J 2007/0098; H04B 5/0037
See application file for complete search history.

(56) References Cited

U.S. PATENT DOCUMENTS

| | | | |
|---|---|---|---|
| 2008/0136596 A1* | 6/2008 | Yeo | ..................... G06K 19/0705 340/10.1 |
| 2009/0309705 A1* | 12/2009 | Kimura | .............. G06K 19/0705 340/10.1 |
| 2010/0203831 A1* | 8/2010 | Muth | ...................... H02J 17/00 455/41.2 |
| 2011/0119144 A1* | 5/2011 | Grilli | .................. G06Q 30/0267 705/26.1 |
| 2011/0250841 A1* | 10/2011 | Hulvey | ................ H04B 5/0062 455/41.1 |
| 2011/0304219 A1 | 12/2011 | Erdmann et al. | |
| 2012/0235499 A1* | 9/2012 | Liu | ......................... H02J 17/00 307/104 |

(Continued)

FOREIGN PATENT DOCUMENTS

| | | |
|---|---|---|
| JP | 2010183689 A | 8/2010 |
| JP | 2011152018 A | 8/2011 |
| JP | 2012519467 A | 8/2012 |
| JP | 2013165043 A | 8/2013 |

*Primary Examiner* — Duc M Nguyen
(74) *Attorney, Agent, or Firm* — Holtz, Holtz & Volek PC (57) ABSTRACT

According to one embodiment, a power reception device includes: a power receiver that wirelessly receives power from a power transmission device; a power storage that stores the power received by the power receiver; and a signal transmitter configured to transmit a detection signal, the signal transmitter being independent of a power system operating with power fed from the power storage.

11 Claims, 5 Drawing Sheets

(56) References Cited

U.S. PATENT DOCUMENTS

| | | | | |
|---|---|---|---|---|
| 2012/0235636 | A1* | 9/2012 | Partovi | H02J 7/025 320/108 |
| 2012/0294463 | A1* | 11/2012 | Chu | H04M 1/6041 381/150 |
| 2012/0295634 | A1* | 11/2012 | Kim | H02J 7/025 455/456.1 |
| 2013/0040707 | A1* | 2/2013 | Metcalf | H01M 10/465 455/566 |
| 2013/0065649 | A1* | 3/2013 | Kong | H04M 1/0202 455/566 |
| 2013/0217409 | A1* | 8/2013 | Bridges | B60L 11/1842 455/456.1 |
| 2013/0307468 | A1* | 11/2013 | Lee | H02J 7/0052 320/108 |
| 2014/0094116 | A1* | 4/2014 | Walley | H02J 7/0004 455/41.1 |
| 2014/0106817 | A1* | 4/2014 | Lin | H04M 1/21 455/557 |
| 2014/0354223 | A1* | 12/2014 | Lee | H02J 5/005 320/108 |
| 2015/0045091 | A1* | 2/2015 | Nakatani | H04B 5/0031 455/556.1 |
| 2015/0097438 | A1* | 4/2015 | Aioanei | H02J 7/025 307/104 |
| 2015/0333530 | A1* | 11/2015 | Moyer | H02J 7/025 307/104 |
| 2016/0099755 | A1* | 4/2016 | Leabman | H04B 5/0037 307/104 |
| 2016/0352390 | A1* | 12/2016 | Park | H04B 5/0037 |

\* cited by examiner

POWER RECEPTION DEVICE, POWER TRANSMISSION DEVICE, AND WIRELESS POWER TRANSMISSION SYSTEM

CROSS-REFERENCE TO RELATED APPLICATIONS

This application is based upon and claims the benefit of priority from Japanese Patent Application No. 2015-223267, filed Nov. 13, 2015; the entire contents of which are incorporated herein by reference.

FIELD

Embodiments of the present invention relate to a power reception device, a power transmission device, and a wireless power transmission system.

BACKGROUND

In recent years, a wireless power transmission system has attracted attention. In general, the wireless power transmission system includes a power transmission device that wirelessly transmits power, and a power reception device that wirelessly receives power and charges a battery. The wireless power transmission system in which the power reception device requests power transmission using a radio signal and the power transmission device transmits power in response to the request has been proposed.

In the existing wireless power transmission system, the power reception device uses power stored in the battery to transmit the radio signal. Accordingly, if the charged energy of the battery is running short, the power reception device cannot request the power transmission device for power transmission. There is a risk that the battery may not be charged.

DETAILED DESCRIPTION

According to one embodiment, a power reception device includes: a power receiver that wirelessly receives power from a power transmission device; a power storage that stores the power received by the power receiver; and a signal transmitter configured to transmit a detection signal, the signal transmitter being independent of a power system operating with power fed from the power storage.

Referring to the drawings, embodiments of the present invention will be described below.

First Embodiment

Figure 1:
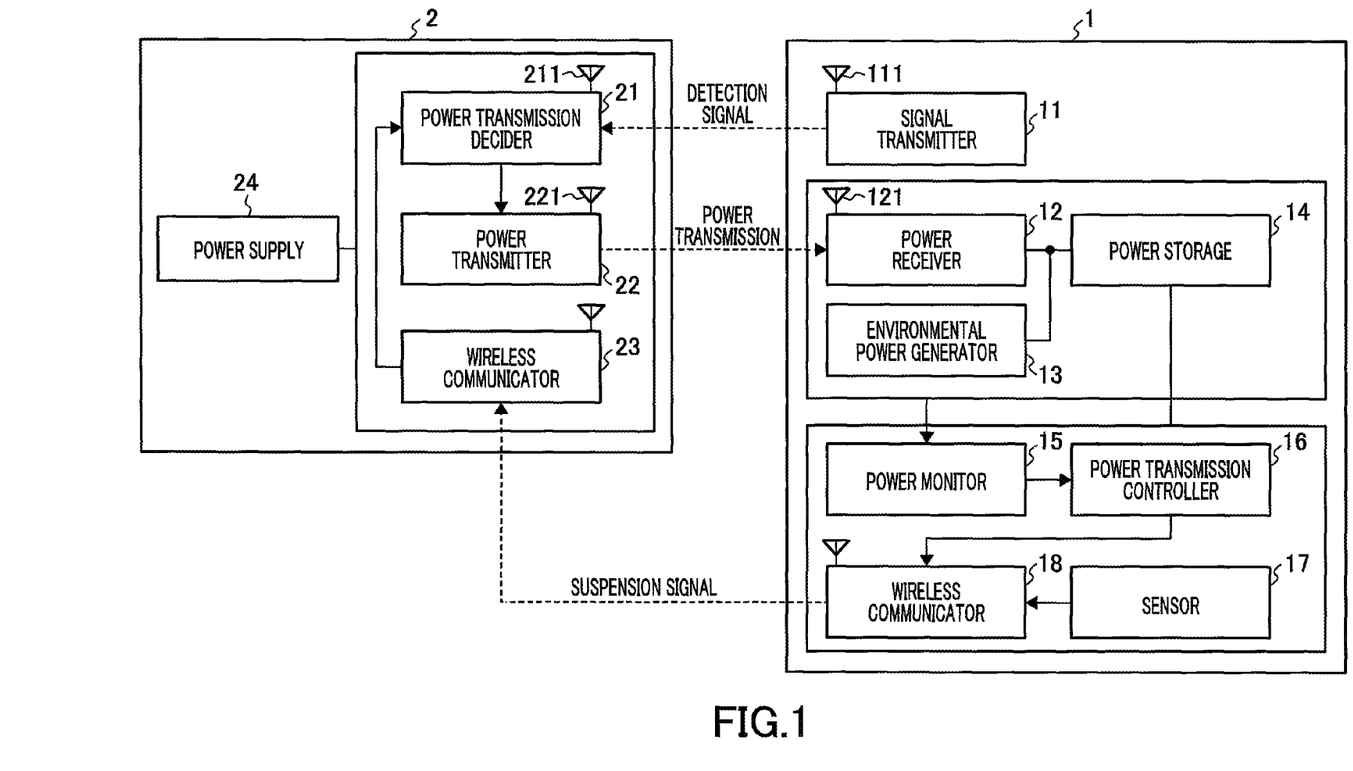
FIG. 1 is a diagram showing an example of a wireless power transmission system in accordance with a first embodiment.
Figure 2:
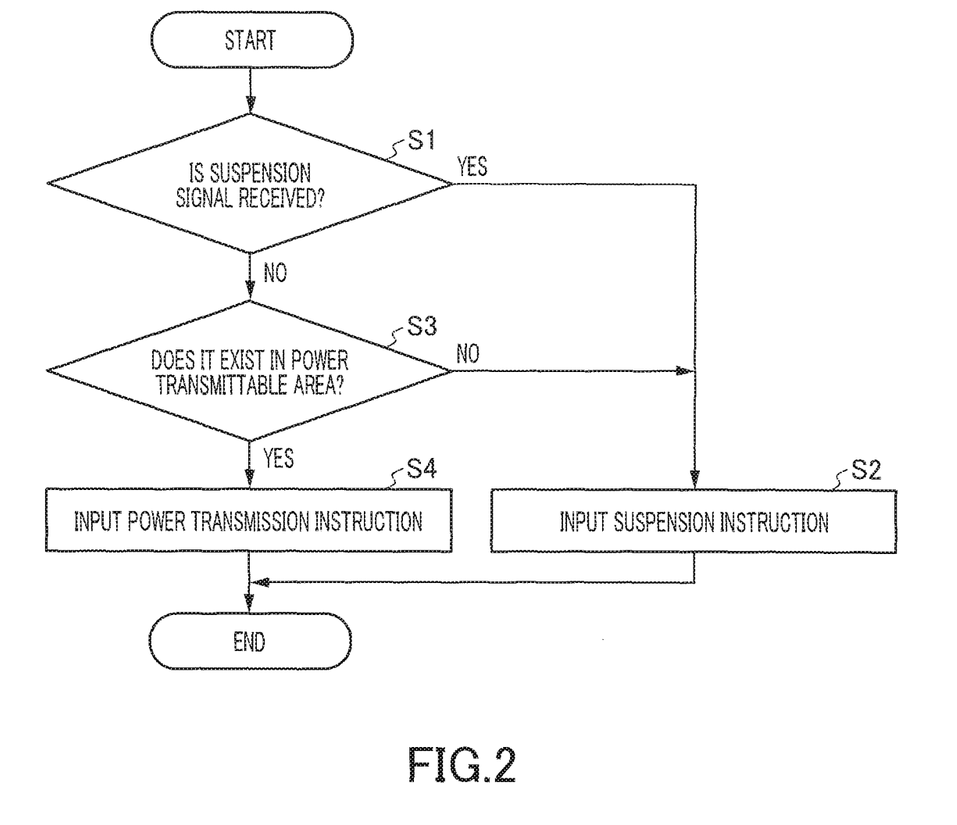
FIG. 2 is a flowchart describing an operation of a power transmission device.

A wireless power transmission system (hereinafter, simply, system) in accordance with a first embodiment will be described below in conjunction with FIG. 1 to FIG. 3. FIG. 1 is a diagram showing an example of the system in accordance with the present embodiment. The system in FIG. 1 includes a power reception device 1 and a power transmission device 2. In the example in FIG. 1, the system includes one power reception device 1 and one power transmission device 2. Alternatively, the system may include plural power reception devices and plural power transmission devices.

Between the power reception device 1 and the power transmission device 2, power (electrical power) is transferred through wireless power transmission. Hereinafter, a scheme of wireless power transmission shall be a radio wave scheme. Alternatively, an electromagnetic induction scheme or electromagnetic field resonance scheme will do.

The power reception device 1 wirelessly receives power from the power transmission device 2, and stores the received power. The power reception device 1 includes a signal transmitter 11, power receiver 12, environmental power generator (energy harvester) 13, power storage 14, power monitor 15, power transmission controller 16, wireless communicator 18, and sensor 17.

The signal transmitter 11 transmits a detection signal. The detection signal is a radio signal carrying identification information such as an ID of the power reception device 1. The power transmission device 2 uses the detection signal to decide whether the power reception device 1 exists in a power transmittable area.

What is referred to as the power transmittable area is an area in which power enabling the power reception device 1 to continuously operate can be transmitted from the power transmission device 2 to the power reception device 1. The power enabling the power reception device 1 to continuously operate refers, for example, to the average power consumption of the power reception device 1.

When the power reception device 1 exists in the power transmittable area, if the power transmission device 2 transmits power, the power reception device 1 can receive the power enabling continuous operation. In contrast, when the power reception device 1 does not exist in the power transmittable area, even if the power transmission device 2 transmits power, the power reception device 1 cannot receive the power enabling continuous operation.

The signal transmitter 11 is formed with an electronic circuit that is independent of the power system of the power storage 14, and does not receive power fed from the power storage 14. The signal transmitter 11 has an antenna 111 through which a detection signal is transmitted.

The signal transmitter 11 is, for example, formed with a radio frequency identifier (RFID) tag. The RFID tag is, for example, a one-chip integrated circuit (IC) tag. The IC tag may have the antenna 111 incorporated in it, or may be connected to the external antenna 111. By incorporating the antenna 111 in the IC tag, the IC tag can be compactly formed. In contrast, when the IC tag is connected to the external antenna 111, a transmission distance of a detection signal can be prolonged. The RFID tag may be an active tag or a passive tag.

When the signal transmitter 11 is formed with an active tag, the signal transmitter 11 is provided with a power supply independent of the power storage 14. The signal transmitter 11 uses the power supply to transmit a detection signal. Therefore, even if the power storage 14 becomes empty, the signal transmitter 11 can transmit the detection signal until the power supply for the active tag runs out. By forming the signal transmitter 11 with the active tag, the transmission distance of the detection signal can be prolonged.

In contrast, when the signal transmitter 11 is formed with a passive tag, the signal transmitter 11 reflects a radio wave transmitted from the power transmission device 2. When reflecting the radio wave, the signal transmitter 11 changes a reflection coefficient to a binary digit, digitally encodes a reflected wave, and superposes identification information on the reflected wave. The reflected wave to which the identification information is superposed becomes a detection signal.

Since the passive tag acts using a radio wave, which is transmitted from the power transmission device 2, as an energy source, a power supply is unnecessary. Therefore, even when the power storage 14 becomes empty, as long as the power transmission device 2 transmits the radio wave, the signal transmitter 11 can transmit the detection signal. In addition, since the passive tag does not need an independent power supply, the signal transmitter 11 can be readily formed.

The power receiver 12 receives power wirelessly transmitted from the power transmission device 2. More particularly, the power receiver 12 receives a radio wave transmitted from the power transmission device 2, converts the received radio wave into alternating-current (ac) power, rectifies the ac power into direct-current (dc) power, and outputs the dc power. The power receiver 12 includes an antenna 121 through which a radio wave is received, and a rectification circuit (not shown) that rectifies the ac power.

The power receiver 12 is preferably disposed adjacently to the signal transmitter 11. In addition, the antenna 121 of the power receiver 12 and the antenna 111 of the signal transmitter 11 are preferably realized with a common antenna. Owing to the configuration, the radio wave directivities of the power receiver 12 and signal transmitter 11 respectively can be approximated to each other.

The environmental power generator 13 generates power by utilizing ambient energy such as vibrations, a temperature difference, light, or the like. A power generation method to be adopted by the environmental power generator 13 includes vibrational power generation, thermoelectric power generation, and solar photovoltaic generation. When utilizing vibrational power generation, thermoelectric power generation, or solar photovoltaic generation, the environmental power generator 13 includes as a power generation element a piezoelectric element, thermoelectric element, or photoelectric element. The environmental power generator 13 may use one power generation method to generate power, or may use two or more power generation methods to generate power.

The power storage 14 stores power, which is received by the power receiver 12, and power generated by the environmental power generator 13. The power storage 14 serves as a power supply for the power monitor 15, power transmission controller 16, wireless communicator 18, and sensor 17. The power storage 14 is, for example, a secondary battery or a large-capacitance capacitor.

The power monitor 15 collects pieces of power data concerning the power receiver 12, environmental power generator 13, and power storage 14 respectively. The power data is data representing a physical quantity such as a voltage, a current, power, or electric energy. The power data contains, for example, power or a voltage received by the power receiver 12, power or a voltage generated by the environmental power generator 13, or charging electric energy or a charging voltage for the power storage 14. The power monitor 15 may include a voltage sensor, current sensor, and power sensor for use in detecting the pieces of power data of the power receiver 12, environmental power generator 13, and power storage 14 respectively.

When the power data is an analog value, the power monitor 15 converts the analog value to a digital value. In this case, the power monitor 15 may include an analog-to-digital converter. The power monitor 15 inputs the power data, which has been converted into the digital value, to the power transmission controller 16.

The power transmission controller 16 is formed with a digital signal processing circuit such as a microcomputer, and controls the power transmission device 2 on the basis of pieces of power data input from the power monitor 15. The power transmission controller 16 outputs a control signal to control the power transmission device 2, on the basis of the pieces of power data, and inputs the control signal to the wireless communicator 18.

In the present embodiment, the power transmission controller 16 controls suspension of power transmission to be performed by the power transmission device 2. In order to control the suspension of power transmission, the power transmission controller 16 outputs as a control signal a suspension signal with which the power transmission from the power transmission device 2 is suspended. A control method according to which the power transmission controller 16 controls the power transmission device 2 will be detailed later.

The sensor 17 detects an ambient state of the power reception device 1 such as the temperature, humidity, acceleration, pressure, magnetism, or image, and outputs a result of detection. The result of detection output from the sensor 17 is referred to as sensor data. The sensor 17 is driven by the power storage 14. The power reception device 1 may not include the sensor 17.

The wireless communicator 18 wirelessly communicates with external device such as the power transmission device 2. The wireless communicator 18 transmits, for example, a control signal, which is input from the power transmission controller 16, to the power transmission device 2. The wireless communicator 18 transmits sensor data, which is input from the sensor 17, or pieces of power data, which are output from the power monitor 15, to the external device. As the wireless communicator 18, an existing wireless communication device may be adopted.

The power transmission device 2 wirelessly transmits power to the power reception device 1. The power transmission device 2 includes a power transmission decider 21, power transmitter 22, wireless communicator 23, and power supply 24.

The power transmission decider 21 includes an antenna 221 through which a detection signal is received. The power transmission decider 21 receives the detection signal transmitted from the signal transmitter 11, and calculates the signal strength of the received detection signal. The signal strength is, for example, a received signal strength indicator (RSSI), but is not limited to the RSSI. Based on the calculated signal strength, the power transmission decider 21 decides whether power transmission is performed.

If the signal strength of a detection signal is larger than a predetermined threshold, the power transmission decider 21 decides that power transmission is performed. If the signal strength of the detection signal is equal to or smaller than the threshold, the power transmission decider 21 decides that power transmission is not performed. The threshold of the signal strength is the signal strength signifying that the power reception device 1 can receive power, which enables the power reception device to continuously operate, when power transmission is performed by the power transmission device 2. Therefore, when the signal strength of the detection signal is larger than the threshold, it means that the power reception device 1 exists in a power transmittable area. When the signal strength of the detection signal falls below the threshold, it means that the power reception device 1 does not exist in the power transmittable area.

For example, assuming that a load to be driven by the power storage 14 is a Bluetooth Low Energy (BLE) device alone, when the BLE device intermittently operates to perform one communication per sec, the average power consumption of the BLE device is approximately 50 μW. Therefore, as long as power of approximately 50 μW or more can be received, the power reception device 1 can continuously operate. Therefore, in this example, the signal strength signifying that the power reception device 1 can receive power of approximately 50 μW or more from the power transmission device 2 is the threshold of the signal strength.

Since the power transmission decider 21 decides based on a detection signal whether the power reception device 1 exists in a power transmittable area, the radio wave directivities of the power receiver 12 and signal transmitter 11 respectively are preferably approximate to each other. Accordingly, deciding precision can be upgraded.

When deciding that power transmission is performed, the power transmission decider 21 inputs a power transmission instruction to the power transmitter 22 and thus allows the power transmitter 22 to perform power transmission. The power transmission instruction is an instruction causing the power transmitter 22 to initiate or continue power transmission. In contrast, when deciding that power transmission is not performed, the power transmission decider 21 inputs a suspension instruction to the power transmitter 22 and thus allows the power transmitter 22 to suspend power transmission. The suspension instruction is an instruction causing the power transmitter 22 to suspend power transmission or continue suspension of power transmission. Not inputting the power transmission instruction may be equivalent to inputting the suspension instruction.

The threshold of the signal strength is predesignated. The threshold may be set to a value dependent on the specification for the power transmitter 22 or may be set to an experimentally obtained value.

When receiving a suspension signal from the power reception device 1, the power transmission decider 21 inputs a suspension instruction to the power transmitter 22 so as to suspend power transmission irrespective of the signal strength of a detection signal.

The power transmitter 22 wirelessly transmits power to the power reception device 1. More particularly, the power transmitter 22 converts power, which is fed from the power supply 24, into a radio wave, and transmits the radio wave. The power transmitter 22 includes an antenna 221 through which the radio wave is transmitted, and an oscillator (not shown) that produces a radio wave having a predetermined frequency. When inputting a power transmission instruction from the power transmission decider 21, the power transmitter 22 performs power transmission. When inputting a suspension instruction, the power transmitter 22 suspends power transmission.

When the signal transmitter 11 is formed with a passive tag, the power transmitter 22 transmits a radio wave at intervals of a predetermined time for the purpose of producing a detection signal through reflection. The radio wave for use in producing the detection signal is, similarly to a radio wave for power transmission, produced by converting power fed from the power supply 24. The radio wave for use in producing the detection signal may be different from the radio wave for power transmission in terms of the signal strength or frequency.

The wireless communicator 23 wirelessly communicates with external device such as the power reception device 1. The wireless communicator 23 inputs, for example, a control signal, which is received from the wireless communicator 18, to the power transmission decider 21. In addition, the wireless communicator 23 may transmit the signal strength of a detection signal, which is calculated by the power transmission decider 21, or power data of the power supply 24 to the external device. As the wireless communicator 23, an existing wireless communication device may be adopted.

The power supply 24 is a power supply that feeds power to the power transmission decider 21, power transmitter 22, and wireless communicator 23. The power supply 24 may be a dc power supply such as a battery or an ac power supply such as a mains power supply. The power transmission device 2 may not include the power supply 24. In this case, the power transmission device 2 is connected to an external power supply and then put to use.

Next, the operations of the power reception device 1 and the power transmission device 2 respectively will be described below in conjunction with FIG. 2 and FIG. 3. FIG. 2 is a flowchart describing an example of the operation of the power transmission device 2. The power transmission device 2 repeats an operation described below at intervals of a predetermined time.

To begin with, the power transmission decider 21 verifies whether a suspension signal has been received from the power reception device 1 via the wireless communicator 23 (step S1).

If the suspension signal has been received (Yes at step S1), the power transmission decider 21 inputs a suspension instruction to the power transmitter 22 (step S2). When power transmission is in progress, the power transmitter 22 suspends the power transmission. When power transmission is suspended, the power transmitter continues the suspension of power transmission. Thereafter, processing is terminated.

In contrast, if a suspension signal is not received (No at step S1), the power transmission decider 21 receives a detection signal, calculates the signal strength of the detection signal, compares the signal strength with a threshold, and decides whether the power reception device 1 exists in a power transmittable area (step S3).

If a decision is made that the power reception device 1 exists in the power transmittable area (Yes at step S3), the power transmission decider 21 inputs a power transmission instruction to the power transmitter 22. If power transmission is in progress, the power transmitter 22 continues the power transmission. If power transmission is suspended, the power transmission is initiated. Thereafter, processing is terminated.

If a decision is made that the power reception device 1 does not exist in a power transmittable area (No at step S3), processing proceeds to step S2. The power transmission decider 21 inputs a suspension instruction to the power transmitter 22.

Figure 3:
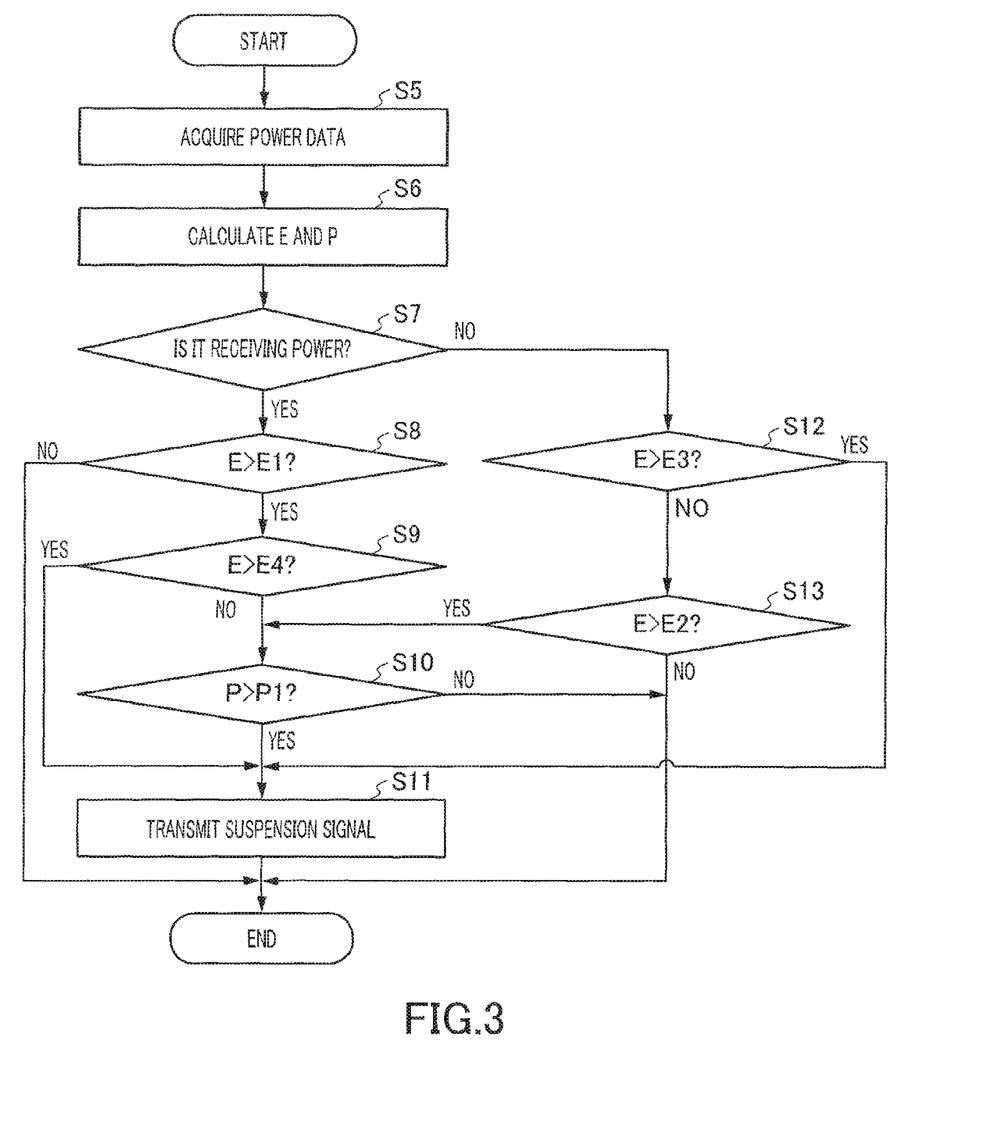
FIG. 3 is a flowchart describing an operation of a power reception device.

FIG. 3 is a flowchart describing the operation of the power reception device 1. The flowchart of FIG. 3 is equivalent to a control method according to which the power transmission controller 16 controls the power transmission device 2. The power reception device 1 repeats an operation described below at intervals of a predetermined time. The operation of the power reception device 1 may or may not be synchronous with the operation of the power transmission device 2.

Hereinafter, a charged energy of the power storage 14 of the power reception device 1 shall be referred to as a charged energy E, a minimally charged energy of the power storage 14 shall be referred to as a first charged energy E1, and a fully charged energy of the power storage 14 shall be referred to as a fourth charged energy E4. The first charged energy E1 (minimally charged energy) is, for example, a charged energy necessary to activate the sensor 17 or wireless communicator 18.

A charged energy larger by a predetermined capacity than the first charged energy E1 shall be referred to as a second charged energy E2, and a charged energy smaller by the predetermined capacity than the fourth charged energy E4 shall be referred to as a third charged energy. The predetermined capacity is a margin for suppressing control that is too sensitive to a change in the charged energy E. The above charged energy have a relationship of $E1<E2<E3<E4$.

Power being generated by the environmental power generator 13 shall be referred to as generated power P, and power enabling the power reception device 1 to continuously operate shall be referred to as first generated power P1.

To begin with, the power transmission controller 16 acquires pieces of power data of the power receiver 12, environmental power generator 13, and power storage 14 respectively from the power monitor 15 (step S5).

Thereafter, the power transmission controller 16 calculates the charged energy E and generated power P on the basis of the acquired pieces of power data (step S6). If the power data contains the charged energy E and generated power P, step S6 can be omitted.

Thereafter, the power transmission controller 16 decides whether the power reception device 1 is receiving power (step S7). For example, based on the power data of the power receiver 12, the power transmission controller 16 decides whether the power reception device is receiving power.

A case where the power reception device is receiving power is equivalent to a case where the power reception device exists in a power transmittable area and the power transmission device 2 does not transmit a suspension signal. A case where the power reception device is not receiving power is equivalent to a case where the power reception device 1 does not exist in the power transmittable area or the power transmission device 2 has transmitted the suspension signal.

If the power reception device 1 is receiving power (Yes at step S7), the power transmission controller 16 compares the charged energy E with the first charged energy E1 (step S8).

If the charged energy E is equal to or smaller than the first charged energy E1 (No at step S8), the power transmission controller 16 terminates processing. Specifically, the power transmission controller 16 does not output a suspension signal but allows the power transmission device 2 to continue power transmission. Accordingly, the power storage 14 can be charged until the charged energy E gets larger than the first charged energy E1.

In contrast, if the charged energy E is larger than the first charged energy E1 (Yes at step S8), the power transmission controller 16 compares the charged energy E with the fourth charged energy E4 (step S9).

If the charged energy E is larger than the fourth charged energy E4 (Yes at step S9), the power transmission controller 16 outputs a suspension signal. The suspension signal is transmitted to the power transmission device 2 by the wireless communicator 18 (step S11), and processing is terminated. On receipt of the suspension signal, the power transmission device 2 suspends power transmission. Accordingly, when the charged energy E is larger than the fourth charged energy E4, charging the power storage 14 is suspended in order to suppress overcharge.

In contrast, if the charged energy E is equal to or smaller than the fourth charged energy E4 (No at step S9), the power transmission controller 16 compares the generated power P with the first generated power P1 (step S10).

If the generated power P is larger than the first generated power P1 (Yes at step S10), the power transmission controller 16 outputs a suspension signal. The suspension signal is transmitted to the power transmission device 2 by the wireless communicator 18 (step S11), and processing is terminated. On receipt of the suspension signal, the power transmission device 2 suspends power transmission.

This is because even if power is not transmitted from the power transmission device 2, the power reception device 1 can continuously operate owing to power generated by the environmental power generator 13. When the generated power P is larger than the first generated power P1, excess power transmission from the power transmission device 2 is suppressed by suspending power transmission. Eventually, the power consumption of the power transmission device 2 can be reduced.

In contrast, if the generated power P is equal to or smaller than the first generated power P1 (No at step S10), the power transmission controller terminates processing. Specifically, the power transmission controller 16 does not output a suspension signal but allows the power transmission device 2 to continue power transmission. Accordingly, a decrease in the charged energy E of the power storage 14 can be suppressed.

In contrast, if the power reception device 1 is not receiving power (No at step S7), the power transmission controller 16 performs steps S12 and S13. Steps S12 and S13 are performed on the assumption that power transmission to the power reception device 1 existent in a power transmittable, area has been suspended in response to a suspension signal.

First, the power transmission controller 16 compares the charged energy E with the third charged energy E3 (step S12).

If the charged energy E is larger than the third charged energy E3 (Yes at step S12), the power transmission controller 16 outputs a suspension signal. The suspension signal is transmitted to the power transmission device 2 by the wireless communicator 18 (step S11), and processing is terminated. When receiving the suspension signal, the power transmission device 2 continues suspension of power transmission.

After power transmission is suspended in response to a suspension signal, repetition of initiation and suspension of power transmission is suppressed by permitting the charged energy E to decrease down to the third charged energy E3. Eventually, the power consumption of the power transmission device 2 can be reduced.

In contrast, if the charged quantity E is equal to or smaller than the third charged energy E3 (step S12), the power transmission controller 16 compares the charged energy E with the second charged energy E2 (step S13).

If the charged energy E is equal to or smaller than the second charged energy E2 (No at step S13), the power transmission controller terminates processing. In other words, the power transmission controller 16 does not output a suspension signal. After power transmission is suspended in response to the suspension signal, if transmission of the suspension signal is ceased, the power transmission device 2 resumes power transmission. Accordingly, the charged energy E of the power storage 14 can be maintained at a charged energy equal to or larger than the second charged energy E2 which is larger by a predetermined margin than the first charged energy E1. As a result, the stability in the operation of the power reception device 1 can be upgraded.

In contrast, if the charged energy E is larger than the second charged energy E2 (Yes at step S13), the power transmission controller 16 compares the generated power P with the first generated power P1 (step S10).

If the generated power P is larger than the first generated power P1 (Yes at step S10), the power transmission controller 16 outputs a suspension signal. The suspension signal is transmitted to the power transmission device 2 by the wireless communicator 18 (step S11), and processing is terminated. When receiving the suspension signal, the power transmission device 2 continues suspension of power transmission.

This is because even if power is not transmitted from the power transmission device 2, the power reception device 1 can continuously operate owing to power generated by the environmental power generator 13. When the generated power P is larger than the first generated power P1, excess power transmission from the power transmission device 2 is suppressed by suspending power transmission. Eventually, the power consumption of the power transmission device 2 can be reduced.

In contrast, if the generated power P is equal to or smaller than the first generated power P1 (No at step S10), the power transmission controller terminates processing. In other words, the power transmission controller 16 does not output a suspension signal. After power transmission is suspended in response to the suspension signal, if transmission of the suspension signal is ceased, the power transmission device 2 resumes power transmission. Accordingly, the charged energy E of the power storage 14 can be maintained. As a result, the stability in the operation of the power reception device 1 can be upgraded.

As described so far, the power reception device 1 transmits a detection signal using the signal transmitter 11. The power transmission device 2 performs power transmission according to the signal strength of the detection signal. The signal transmitter 11 is independent of a power system which operates using power fed from the power storage 14.

As a result, in the present embodiment, even, when the charged energy of the power storage 14 is limited or the power storage 14 is empty, power is transmitted from the power transmission device 2 to the power reception device 1 in order to charge the power storage 14.

When the power reception device 1 does not exist within a power transmittable range, since the power transmission device 2 does not perform power transmission, wasteful power transmission from the power transmission device 2 is suppressed. Eventually, the power consumption of the power transmission device 2 can be reduced.

In the above description, the power transmission controller 16 uses the charged energy E and generated power P to control the power transmission device 2. Any other physical quantity (for example, a voltage) comparable to the charged energy E and generated power P may be used to control the power transmission device 2.

Second Embodiment

Figure 4:
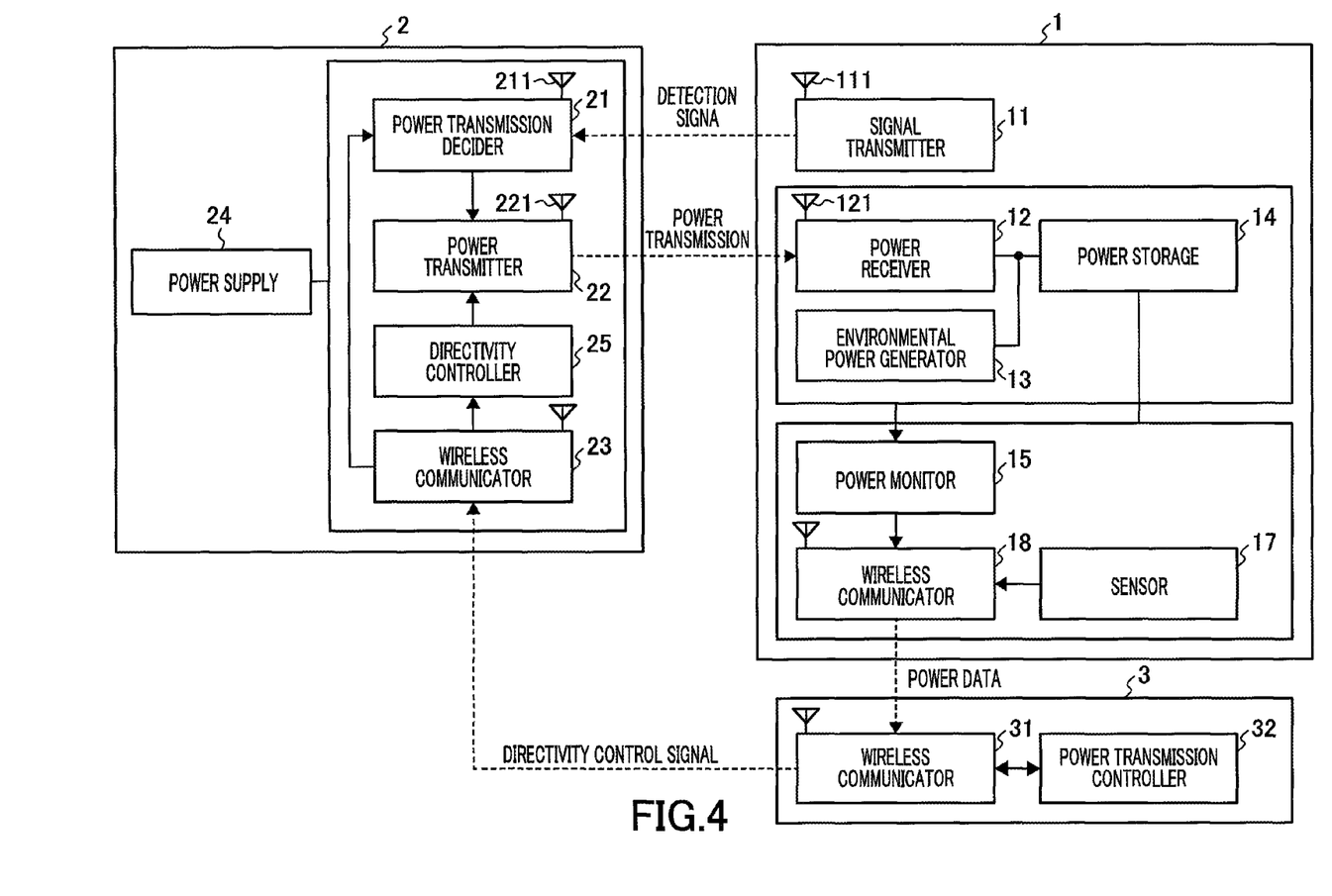
FIG. 4 is a diagram showing an example of a wireless power transmission system in accordance with a second embodiment.
Figure 5:
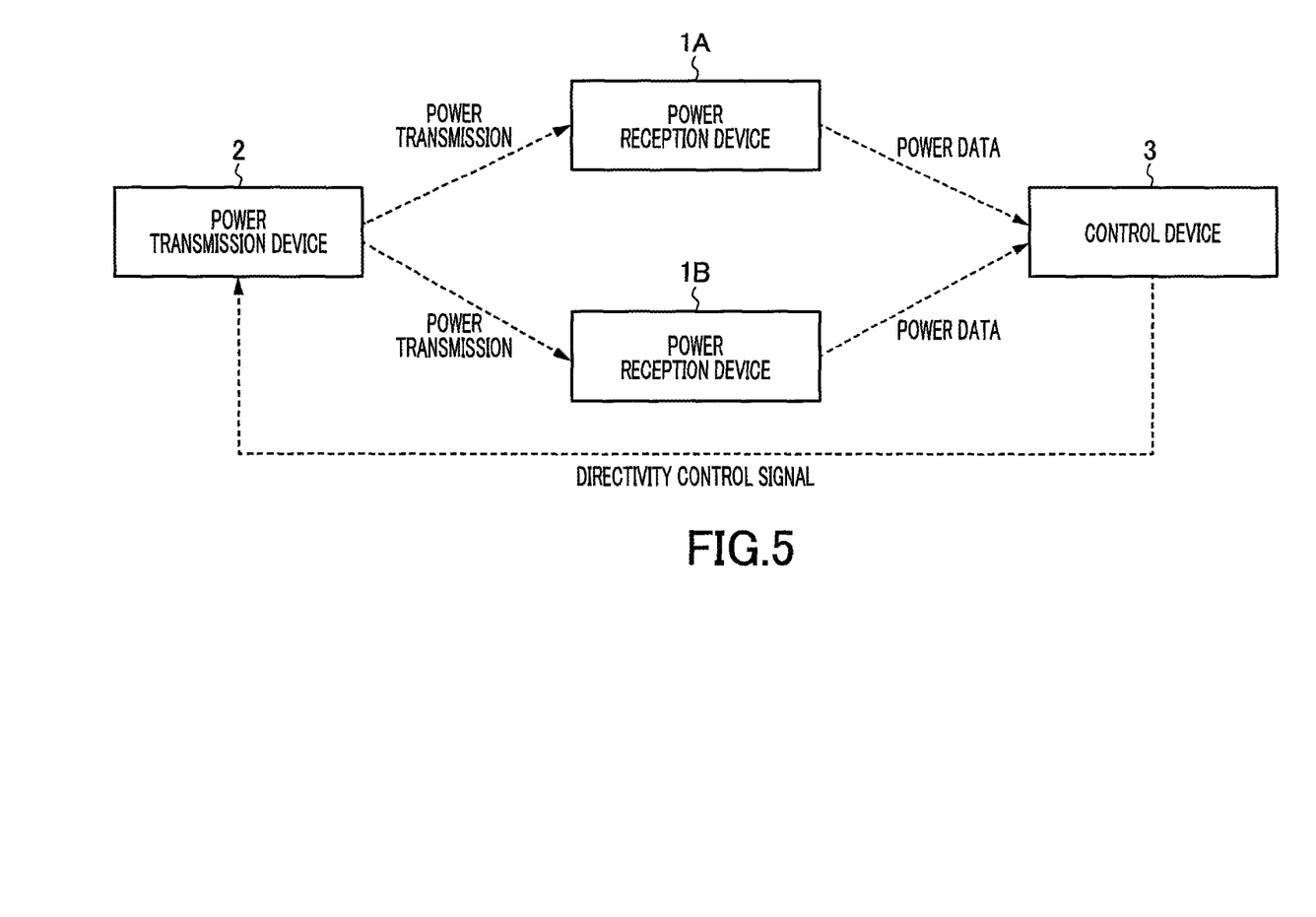
FIG. 5 is an explanatory diagram concerning a control method for radio wave directivity.

A system in accordance with a second embodiment will be described below in conjunction with FIG. 4 and FIG. 5. FIG. 4 is a diagram showing an example of the system in accordance with the present embodiment. The system in FIG. 4 includes a power reception device 1, a power transmission device 2, and a control device 3. A description will be made of the system in FIG. 4 while being centered on a difference from the first embodiment.

The power reception device 1 in FIG. 4 does not include the power transmission controller 16. The power monitor 15 inputs acquired pieces of power data to the wireless communicator 18. The wireless communicator 18 transmits input pieces of power data to the control device 3. The other components are identical to those of the power reception device 1 in FIG. 1.

The power transmission device 2 in FIG. 4 includes a directivity controller 25. The directivity controller 25 controls the radio wave directivity of the power transmitter 22. In the present embodiment, the direction of the antenna 221 of the power transmitter 22 can be varied. The directivity controller 25 controls the direction of the antenna 221 so as to control the radio wave directivity of the power transmitter 22. In response to a directivity control signal received from the control device 3, the directivity controller 25 controls the radio wave directivity of the power transmitter 22. The other components are identical to those of the power transmission device 2 in FIG. 1.

The control device 3 controls the power transmission device 2 on the basis of information received from the power reception device 1. The control device 3 includes a wireless communicator 31 and power transmission controller 32.

The wireless communicator 31 wirelessly communicates with external device such as the power reception device 1 or the power transmission device 2. The wireless communicator 31 receives, for example, pieces of power data transmitted from the power reception device 1. The wireless communicator 31 transmits a control signal, which is input from the power transmission controller 32, to the power transmission device 2. As the wireless communicator 31, an existing wireless communication device can be adopted.

The power transmission controller 32 is equivalent to the power transmission controller 16 of the power reception device 1 in the first embodiment. The power transmission controller 32 is formed with a digital signal processing circuit such as a microcomputer, and controls the power transmission device 2 on the basis of pieces of power data which the wireless communicator 31 has received from the power reception device 1. The power transmission controller 32 outputs a control signal to control the power transmission device 2, on the basis of the pieces of power data, and inputs the control signal to the wireless communicator 31.

In the present embodiment, the power transmission controller 32 controls the radio wave directivity of the power transmission device 2. In order to control the radio wave directivity, the power transmission controller 32 outputs, as a control signal, a directivity control signal to control the radio wave directivity of the power transmission device 2. The directivity control signal output from the power transmission controller 32 is transmitted to the power transmission device 2 by the wireless communicator 31.

Now, a control method according to which the power transmission controller 32 controls the radio wave directivity of the power transmission device 2 will be described below. FIG. 5 is an explanatory diagram concerning the control method for the radio wave directivity. In the example of FIG. 5, a system includes two power reception devices 1A and 1B. The power reception devices 1A and 1B have power transmitted from the power transmission device 2, and transmit pieces of power data to the control device 3. Based on the pieces of power data received from the power reception devices 1A and 1B, the control device 3 controls the radio wave directivity of the power transmission device 2. Referring to FIG. 5, four control methods will be described below.

According to the first control method, the control device 3 controls radio wave directivity so as to increase received power of the power reception device 1 whose generated power P is the smallest. For example, if the generated power PA of the power reception device 1A is smaller than the generated power PB of the power reception device 1B, the control device 3 transmits a directivity control signal, which requests the direction of the antenna 221 of the power transmitter 22 to be brought close to the power reception device 1A. In response to the control signal, the directivity controller 25 brings the direction of the antenna 221 close to the power reception device 1A. Accordingly, the control device 3 can increase the received power of the power reception device 1A. The control device 3 should merely calculate generated powers PA and PB on the basis of the pieces of power data of the power reception devices 1A and 1B.

In the first control method, the control device 3 may use a threshold of the generated power P to control radio wave directivity. For example, the control device 3 presumably controls the radio wave directivity so as to increase received power of the power reception device 1 whose generated power P is smaller than the threshold. According to the control method, if the generated powers PA and PB of the power reception devices 1A and 1B are larger than the threshold, the control device 3 does not control the radio wave directivity. As the threshold of the generated power P, the aforesaid first generated power P1 may be adopted.

According to the second control method, the control device 3 controls radio wave directivity so as to increase received power of the power reception device 1 whose power storage 14 has the smallest charged energy E. For example, if the charged energy EA of the power reception device 1A is smaller than the charged energy EB of the power reception device 1B, the control device 3 transmits a directivity control signal that requests the direction of the antenna 221 of the power transmitter 22 to be brought close to the power reception device 1A. In response to the control signal, the directivity controller 25 brings the direction of the antenna 221 close to the power reception device 1A. Accordingly, the control device 3 can increase the received power of the power reception device 1A. The control device 3 should merely calculate charged energy EA and EB on the basis of the pieces of power data of the power reception devices 1A and 1B.

In the second control method, the control device 3 may use a threshold of the charged energy E to control radio wave directivity. For example, the control device 3 presumably controls the radio wave directivity so as to increase received power of the power reception device 1 whose charged energy E is smaller than the threshold. According to the control method, if the charged energy EA and EB of the power reception devices 1A and 1B are larger than the threshold, the control device 3 does not control the radio wave directivity. As the threshold of the charged energy E, the aforesaid first charged energy E1 or second charged energy E2 may be adopted.

According to the third control method, the control device 3 controls radio wave directivity so as to increase received power of the power reception device 1 whose power received from the power transmission device 2 is the smallest. For example, if the received power of the power reception device 1A is smaller than the received power of the power reception device 1B, the control device 3 transmits a directivity control signal that requests the direction of the antenna 221 of the power transmitter 22 to be brought close to the power reception device 1A. In response to the control signal, the directivity controller 25 brings the direction of the antenna 221 close to the power reception device 1A. Accordingly, the control device 3 can increase the received power of the power reception device 1A. The control device 3 should merely calculate the received powers of the power reception devices 1A and 1B on the basis of the pieces of power data of the power reception devices 1A and 1B.

In the third control method, the control device 3 may use a threshold of received power to control radio wave directivity. For example, the control device 3 presumably controls the radio wave directivity so as to increase received power of the power reception device 1 whose received power is smaller than the threshold. According to the control method, if the received powers of the power reception devices 1A and 1B are larger than the threshold, the control device 3 does not control the radio wave directivity. As the threshold of the received power, power (equivalent to the first generated power P1) enabling the power reception device 1 to continuously operate may be adopted.

According to the fourth control method, the control device 3 controls radio wave directivity so as to increase received power of the power reception device 1 whose generated power P is the smallest and whose charged energy E is smaller than a threshold. For example, if the generated power PA of the power reception device 1A is smaller than the generated power PB of the power reception device 1B and the charged energy EA of the power reception device 1A is smaller than the threshold, the control device 3 transmits a directivity control signal that requests the direction of the antenna 221 of the power transmitter 22 to be brought close to the power reception device 1A. In response to the control signal, the directivity controller 25 brings the direction of the antenna 221 close to the power reception device 1A. Accordingly, the control device 3 can increase the received power of the power reception device 1A. As the threshold of the charged energy E, the aforesaid first charged energy E1 or second charged energy E2 may be adopted.

A description has been made by taking for instance a case where a system includes two power reception devices 1A and 1B. Even when the system includes three or more power reception devices 1, the control device 3 can control radio wave directivity according to any of the first to fourth control methods. The control device 3 may control the radio wave directivity by combining two or more of the first to fourth control methods. The control device 3 may control the radio wave directivity according to any control method other than the first to fourth control methods.

As described so far, the system in accordance with the present embodiment includes the control device 3 independently of the power reception devices 1. Accordingly, the control device 3 receives pieces of power data from the plural power reception devices 1, compares the states of the power reception devices 1 with each other on the basis of the received pieces of power data, and controls the radio wave directivity of the power transmission device 2 according to a result of the comparison. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power reception device, comprising:
 a power receiver configured to wirelessly receive power from a power transmission device;

a power storage configured to store the power received by the power receiver;

a signal transmitter configured to transmit a detection signal, the signal transmitter being independent of a power system operating with power fed from the power storage;

an environmental power generator configured to generate environment power, the generated environment power being stored in the power storage;

a power transmission controller configured to output a control signal to control power transmission from the power transmission device, based on power data of at least the environmental power generator among the power receiver, the power storage, and the environmental power generator; and a wireless communicator configured to transmit the control signal to the power transmission device, wherein when a generated power quantity of the environmental power generator is larger than an average power consumption of the power reception device, the power transmission controller is configured to output a suspension signal for suspending the power transmission from the power transmission device.

2. The power reception device according to claim 1, wherein the detection signal transmitted by the signal transmitter is a reflected wave obtained by reflecting a radio wave transmitted from the power transmission device.

3. The power reception device according to claim 1, wherein the signal transmitter includes an RFID tag.

4. The power reception device according to claim 1, wherein the detection signal contains identification information of the power reception device.

5. The power reception device according to claim 1, wherein the signal transmitter and the power receiver include a common antenna.

6. The power reception device according to claim 1, wherein the signal transmitter and the power receiver are adjacent to each other.

7. The power reception device according to claim 1, wherein when charged energy of the power storage is equal to or smaller than a minimally charged energy, the power transmission controller is configured to output a suspension signal for suspending the power transmission from the power transmission device.

8. The power reception device according to claim 1, wherein when charged energy of the power storage is larger than a fully charged energy, the power transmission controller is configured to output a suspension signal for suspending the power transmission from the power transmission device.

9. A wireless power transmission system comprising:
a plurality of power reception devices, a power transmission device, and a control device,
each of the power reception devices comprising:
   a power receiver configured to wirelessly receive power from the power transmission device;
   a power storage configured to store the power received by the power receiver;
   a signal transmitter configured to transmit a detection signal, the signal transmitter being independent of a power system operating with power fed from the power storage; and
   an environmental power generator configured to generate environment power, the generated environment power being stored in the power storage,
the power transmission device comprising:
   a power transmitter configured to wirelessly transmit power to the power reception devices;
   a power transmission decider configured to (i) decide, based on the detection signal, which is received from the respective power reception devices, whether the respective power reception devices exist in a power transmittable area in which the respective power reception devices are able to receive an average consumption power thereof from the power transmitter, and (ii) when deciding that a power reception device of the power reception devices exists in the power transmittable area, cause the power transmitter to perform power transmission; and
   a directivity controller configured to control a radio wave directivity of the power transmitter, and
the control device comprising:
   a power transmission controller configured to output a control signal to control the power transmission from the power transmission device, based on power data of at least the environmental power generator among the power receiver, the power storage, and the environmental power generator of the power reception devices; and
   a wireless communicator configured to receive the power data from the power reception devices and transmit the control signal to the power transmission device,
wherein the power transmission controller is configured to output a directivity control signal to control the radio wave directivity of the power transmitter in order to increase a received power of one of the power reception devices in which the environmental power generator has a smallest generated power quantity among the power reception devices and in which the power storage has a charged energy smaller than a threshold.

10. The wireless power transmission system according to claim 9, wherein:
the power transmission controller is configured to output a directivity control signal to control the radio wave directivity of the power transmitter in order to increase a received power of one of the power reception devices in which the power receiver has a lowest received power, the power storage has a lowest charged energy, or the environmental power generator has a smallest generated power quantity, among the power reception devices.

11. The wireless power transmission system according to claim 9, wherein:
the power transmission controller is configured to output a directivity control signal to control the radio wave directivity of the power transmitter in order to increase a received power of one of the power reception devices in which the power receiver has a received power lower than a first threshold, the power storage has a charged energy lower than a second threshold, or the environmental power generator has a generated power quantity smaller than a third threshold.

* * * * *